United States Patent

Buckler et al.

[11] Patent Number: 5,966,432
[45] Date of Patent: Oct. 12, 1999

[54] REMOTE ANSWERING OF DOORBELL

[75] Inventors: Brian Lawrence Buckler; David Jeffrey Westergaard; Zygmunt Pasturczyk; Alan David Eyre, all of Calgary, Canada

[73] Assignee: Nortel Networks Corporation, Montreal, Canada

[21] Appl. No.: 08/837,975

[22] Filed: Apr. 14, 1997

[51] Int. Cl.[6] ............................. H04M 1/60; H04M 3/42
[52] U.S. Cl. ......................... 379/167; 379/211; 379/229
[58] Field of Search ..................... 379/170, 167, 379/160, 140, 102.01, 102.02, 102.06, 171, 211, 37, 38, 39, 40, 41, 42, 43, 44, 229

[56] References Cited

U.S. PATENT DOCUMENTS

| | | | |
|---|---|---|---|
| 4,588,861 | 5/1986 | Teich | 379/159 |
| 4,731,821 | 3/1988 | Jackson, III | 379/172 |
| 4,764,953 | 8/1988 | Chern et al. | 379/355 |
| 4,769,837 | 9/1988 | McCormick et al. | 379/393 |
| 4,872,194 | 10/1989 | Trell | 379/40 |
| 4,878,243 | 10/1989 | Hashimoto | 379/211 |
| 4,920,560 | 4/1990 | Kageyama | 379/100.14 |
| 4,943,997 | 7/1990 | Chang | 379/160 |
| 5,046,083 | 9/1991 | Trell | 379/102.06 |
| 5,260,986 | 11/1993 | Pershan | 455/413 |
| 5,481,602 | 1/1996 | Griffiths et al. | 379/210 |
| 5,487,111 | 1/1996 | Slusky | 379/211 |
| 5,600,704 | 2/1997 | Ahlberg et al. | 455/445 |
| 5,784,446 | 7/1998 | Stuart | 379/167 |

*Primary Examiner*—Reinhard J. Eisenzopf
*Assistant Examiner*—Charles N. Appiah

[57] ABSTRACT

An apparatus and method for remotely answering a door. The apparatus includes a switch, a telephone transmitter and an a telephone receiver positioned near the door. At least one telephone station is operable to place a telephone call to a remote telephone identified by a pre-determined telephone number. An interface detects actuation of the switch and signals the telephone station to place the telephone call in response to actuation of the switch and places the telephone transmitter and receiver in communication with the telephone to establish telephonic communication between the telephone transmitter and receiver and the remote telephone.

62 Claims, 13 Drawing Sheets

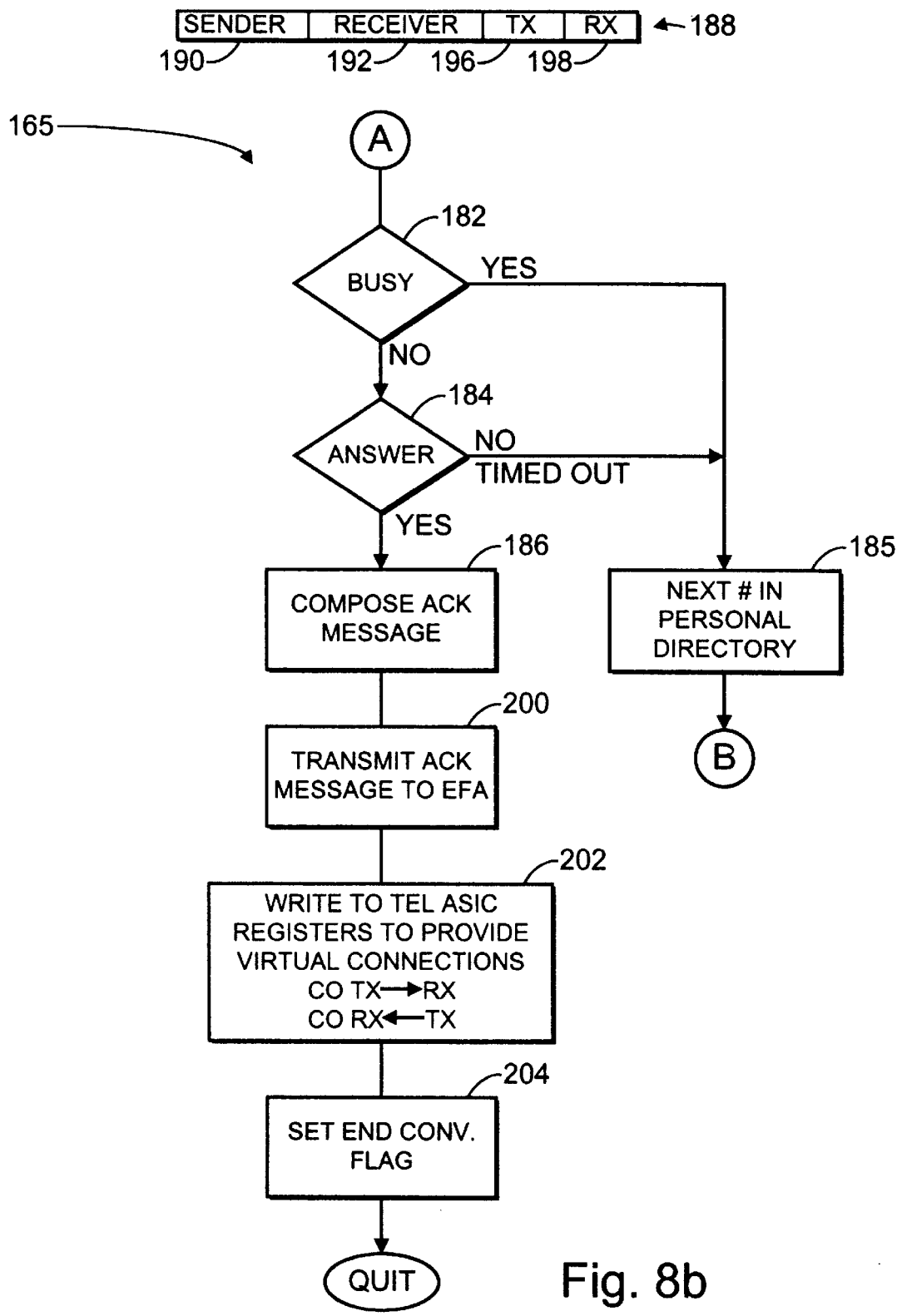

EFA AUDIO TO MESSAGE ROUTINE

5,966,432

REMOTE ANSWERING OF DOORBELL

BACKGROUND OF THE INVENTION

This invention relates to devices for remote answering of a door.

In present times, answering the call of someone at a door of a dwelling can present a security risk to an occupant of the dwelling. Opening the door can provide an opportunity for an intruder to force entry into the dwelling by overcoming the occupant opening the door.

To avoid opening the door when someone calls, devices have been provided to enable intercom communication between the person calling and the occupant of the dwelling. In apartments, for example it is known to employ a device which causes the occupant's telephone to sound a distinctive ring in response to a caller ringing a doorbell. The occupant can then press a key on the dial pad of the telephone and in response, the device actuates a door latch to allow the caller to enter. Thus, communication between the occupant of the dwelling and the caller is established.

However, when the occupant of the dwelling is not home, a person calling at the door may deduce that no one is home, if there is no answer from the intercom and, therefore, may decide to break in. Furthermore, if cleaning personnel attend the door or if a delivery is being made, such persons cannot gain access to the dwelling when there is no one in the dwelling to answer the door.

Therefore, it would be desirable to have a device which would allow a person in a remote location to converse with a caller at the door and to actuate a door latch to enable a person at the door to gain access to the dwelling. The present invention addresses this need.

BRIEF SUMMARY OF THE INVENTION

In accordance with one aspect of the invention, there is provided an apparatus for remotely answering a door. The apparatus includes a switch, a telephone transmitter and an a telephone receiver positioned near the door. It further includes at least one telephone station for placing a telephone call to a remote telephone identified by a pre-determined telephone number and an interface for detecting actuation of the switch and for signalling the telephone station to place the telephone call in response to actuation of the switch and for placing the telephone transmitter and receiver in communication with the telephone to establish telephonic communication between the telephone transmitter and receiver and the remote telephone.

Preferably, the telephone station is connected to a central office line connected to a central office and includes a dialler for dialling the pre-determined telephone number. More than one telephone may be connected to the central office line.

Preferably, the telephone station includes a processor in communication with the dialler, directory memory in communication with the processor and a user input device in communication with the processor and preferably the processor is programmed to store in the directory memory a list of pre-determined telephone numbers entered at the input device and to call at least one of the pre-determined telephone numbers in response to actuation of the switch.

It is desirable that the processor is programmed to prioritize the pre-determined telephone numbers and the processor is programmed to call the pre-determined telephone numbers in order of decreasing priority in response to actuation of the switch.

Preferably, the processor is programmed to call a pre-determined telephone number with a lower priority, after a pre-determined telephone number with a higher priority has been dialled and no telephonic communication has been established after dialling the pre-determined telephone number with the higher priority.

Preferably, the processor is programmed to position each of the pre-determined telephone numbers in the list such that the pre-determined telephone numbers are prioritized by their respective positions in the list.

Preferably, the apparatus includes a call progress tone detector in communication with the processor, for detecting call progress tones on a central office line and preferably, the processor is programmed to determine the status of the telephone call in response to the call progress tones and to dial the pre-determined telephone number with a lower priority when the call progress tones indicate no telephonic communication has been established after dialling the pre-determined telephone number with the higher priority.

Preferably, the interface includes a transmitter for transmitting control and audio messages to the telephone station in response to actuation of the switch, to signal the telephone station to place the telephone call. Preferably, the transmitter is connected to the central office line such that the control message is transmitted to the telephone station on the central office line.

Preferably, the interface includes a transmit audio message generator for generating a transmit audio message in response to acoustic disturbances detected at the telephone transmitter.

Preferably, the telephone station includes receiver for receiving the transmit audio message and for producing telephonic transmission signals in response to the transmit audio message. The telephone station may include a transmitter connected to the central office line, for transmitting the telephonic transmission signals to the central office and may include a receiver for receiving telephonic reception signals from the central office.

Preferably, the receiver includes a receive audio message generator for generating a receive audio message in response to the telephonic reception signals and preferably, the telephone station includes a transmitter for transmitting the receive audio message to the interface.

Preferably, the interface includes a receiver for receiving the receive audio message and for providing a representation of the receive audio message to the telephone receiver.

Preferably, the interface includes a transmitter, connected to the central office line, for transmitting a control message to all of the telephone stations connected to the central office line, in response to actuation of the switch to signal at least one of the telephones station to place the telephone call.

Preferably, there is a tone detector in the telephone station for detecting a dual tone multi-frequency signal produced by the remote telephone and there is a message transmitter for transmitting a message from the telephone station to the interface in response to the dual tone multi-frequency signal.

Preferably, there is a message receiver at the interface for receiving the message and a door control element in communication with the message receiver, the door control element being actuated in response to the message received at the message receiver.

In accordance with another aspect of the invention, there is provided a method remotely answering a door, the method comprising the steps of:

a) detecting actuation of a switch positioned near the door;

b) in response to actuation of the switch, placing a telephone call to a pre-determined telephone number to establish telephonic communication between a telephone transmitter and receiver positioned near the door and a remote telephone associated with the pre-determined telephone number.

Preferably, the method includes the step of establishing communication between a telephone station and the telephone transmitter and receiver.

The step of placing the telephone call may include the step of establishing a telephone call between the telephone station and a central office.

Preferably, the step of placing the telephone call includes the step of dialling, at the telephone station, the pre-determined telephone number.

Preferably, at the telephone station, there is maintained a list of pre-determined telephone numbers to call in response to actuation of the switch and the pre-determined numbers are prioritized.

Preferably, the pre-determined telephone numbers are called in order of decreasing priority in response to actuation of the switch and a pre-determined telephone number with a lower priority is called, after a pre-determined telephone number with a higher priority has been dialled and no telephonic communication has been established after dialling the pre-determined telephone number with the higher priority.

Optionally each of the pre-determined telephone numbers in the list may be prioritized such that the pre-determined telephone numbers are prioritized by their respective positions in the list.

Preferably, the telephone station monitors call progress tones on the central office line to determine the status of the telephone call and dials the pre-determined telephone number with a lower priority when the call progress tones indicate no telephonic communication has been established after dialling the pre-determined telephone number with the higher priority.

Preferably, the method includes the step of transmitting a control message to the telephone station in response to actuation of the switch and the step of placing the telephone call in response to the control message received at the telephone station.

Preferably, the method includes the step of generating the control message at an interface connected to the telephone transmitter and receiver and transmitting the control message from the interface to the telephone station.

Preferably, the method includes the step of transmitting the control message on a telephone line connected to the interface, the telephone station and the central office.

Preferably, the method includes the steps of:
a) producing, at an interface connected to the telephone transmitter and receiver and the telephone station, a representation of acoustic disturbances detected at the telephone transmitter;
b) producing a transmit audio message, at the interface, in response to the representation of acoustic disturbances;
c) transmitting the transmit audio message;
d) receiving the transmit audio message at the telephone station;
e) producing telephonic transmission signals in response to the transmit audio message; and
f) transmitting the telephonic transmission signals to the central office.

Preferably, the method includes the steps of:
a) receiving, at the telephone station, telephonic reception signals from the central office;
b) producing and transmitting a receive audio message in response to the telephonic reception signals;
c) receiving the receive audio message representation; and
d) actuating the telephone receiver in response to the receive audio message representation.

Preferably, the method includes the step of transmitting, on a common central office line to which a plurality of telephone stations are connected, a control message, in response to actuation of the switch.

Preferably, the method includes the step of receiving the control message at least one of the telephone stations and placing the telephone call from the at least one telephone station in response to the control message.

Preferably, the method includes the step of generating the control message at an interface connected to the telephone transmitter and receiver and transmitting the control message from the interface to the at least one telephone station.

Preferably, the method includes the step of actuating a door control element in response to signals produced by the remote telephone.

Preferably, the method includes the step of receiving dual tone multi-frequency signals at a telephone station in communication with an interface for actuating the door control element in response to the dual tone multi-frequency signals.

In accordance with another aspect of the invention, there is provided an apparatus for signalling the actuation of a door bell switch. The apparatus includes a central office line supporting telephonic communications on a telephonic communications channel, a plurality of telephones connected to the central office line, a door bell switch, and an interface operable to transmit a control message on a local communications channel on the central office line, in response to actuation of the switch, the local communications channel being separate from the telephonic communications channel.

In accordance with another aspect of the invention, there is provided a method of signalling the actuation of a door bell switch, the method comprising the step of, in response to actuation of a door bell switch positioned near the door, transmitting a control message on a local communications channel separate from a telephonic communications channel on a central office line to which a plurality of telephones are connected.

Preferably, the method includes the step of receiving the control message at at least one of the telephones and dialling on the central office line a pre-determined telephone number of a remotely located telephone, in response to the control message.

Preferably, the method includes the step of monitoring call progress signals on the central office line to determine whether or not a telephone call is established as a result of dialling the pre-determined telephone number.

Preferably, the method includes the step of when a telephone call is established, passing audio information messages between the at least one of the telephones and a telephone transmitter and receiver positioned near the door.

Preferably, the method includes the step of converting the audio messages received at the telephone, to telephone transmission signals for transmission on the telephonic communications channel.

Preferably, the method includes the step of converting telephone reception signals received on the telephonic communications channel into the audio messages.

Preferably, the method includes the step of passing the control message and the audio information messages, between the telephone transmitter and receiver and the at least one telephone, on the central office line and on the local communications channel.

Preferably, the method includes the step of time division multiplexing the audio and control messages on the local communications channel.

BRIEF DESCRIPTION OF THE SEVERAL VIEWS OF THE DRAWING

In drawings which illustrate embodiments of the invention,

FIG. 8b is a second portion of a flowchart representing a message receiving routine at the telephone set according to the first embodiment of the invention;

DETAILED DESCRIPTION OF THE INVENTION

FIG. 1

Figure 1:
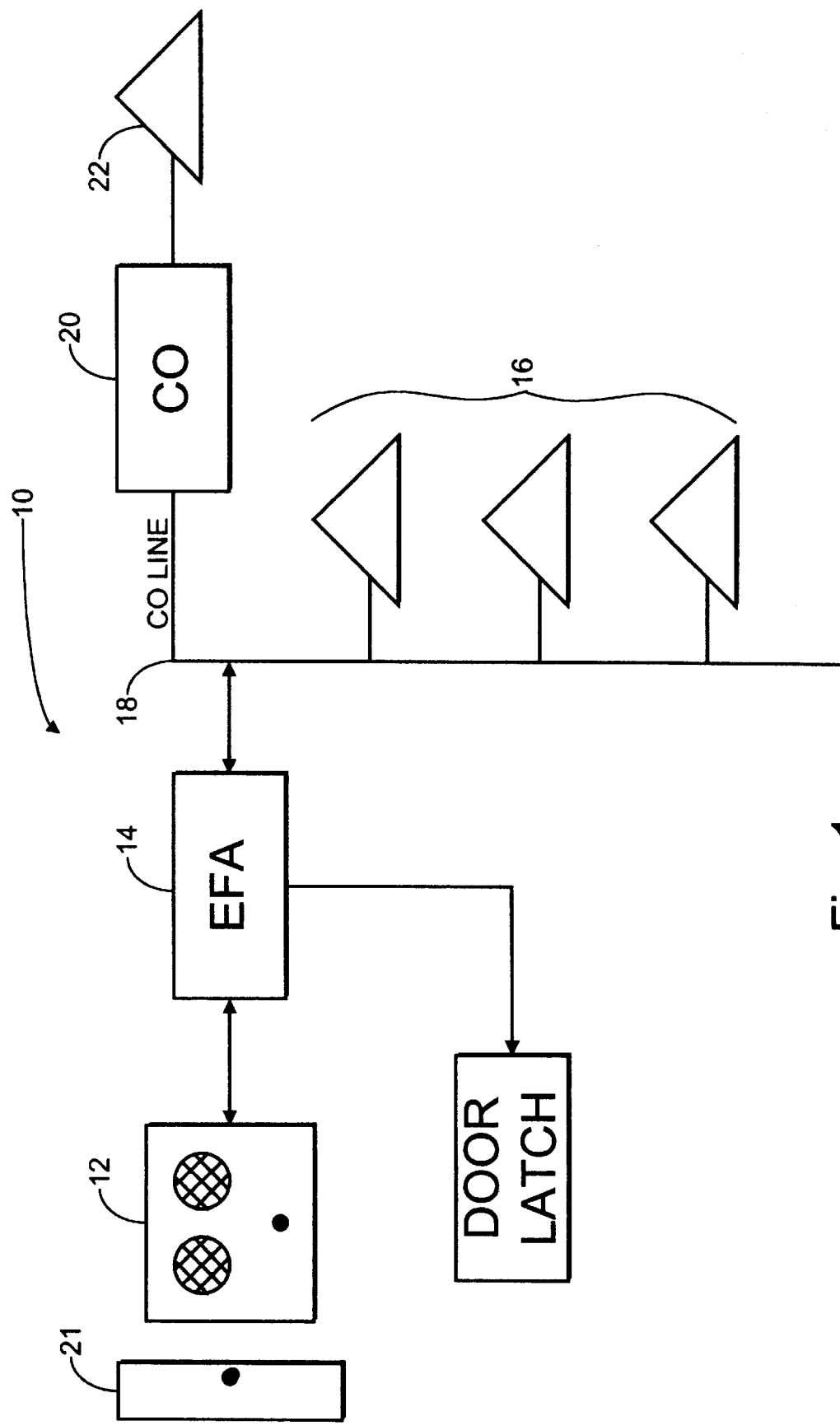
FIG. 1 is a block diagram of an apparatus according to a first embodiment of the invention.

Referring to FIG. 1, an apparatus for signalling the actuation of a door-bell switch, according to a first embodiment of the invention is shown generally at 10. The apparatus includes a Venture (TM) doorphone 12 manufactured by Algo of Vancouver, B.C. Canada, an extended features adapter (EFA) 14 and a plurality 16 of telephone stations connected to a common central office telephone line 18 in communication with a central office 20. The doorphone is mounted near a door 21. The central office line 18 and central office 20 are part of the public telephone network operable to support telephonic communications on a conventional telephonic communications channel at baseband frequencies. In this embodiment, the telephone stations 16 include Venture (TM) phones manufactured by Northern Telecom Limited of Montreal Quebec, Canada.

Conventional telephones including a remote telephone station 22 are also connected to the public telephone network and are operable to be placed in communication with any of the plurality 16 of telephone stations connected to the common central office line 18, via the public telephone network, in the conventional manner. Thus, any of the telephone stations 16 can place a telephone call to any remote telephone station 22, or cellular telephone (not shown), simply by dialling a pre-determined telephone number associated with the remote telephone station 22.

The term "telephone station" has been used here to designate an assemblage of apparatus including a telephone transmitter, a telephone receiver, a switch, and immediately associated wiring and signalling arrangements. Thus, a telephone station may include a conventional telephone set, a telephone modem such as found in a personal computer, an answering machine, and generally any device operable to transmit and receive messages from a conventional central office telephone line.

FIG. 2

Figure 2:
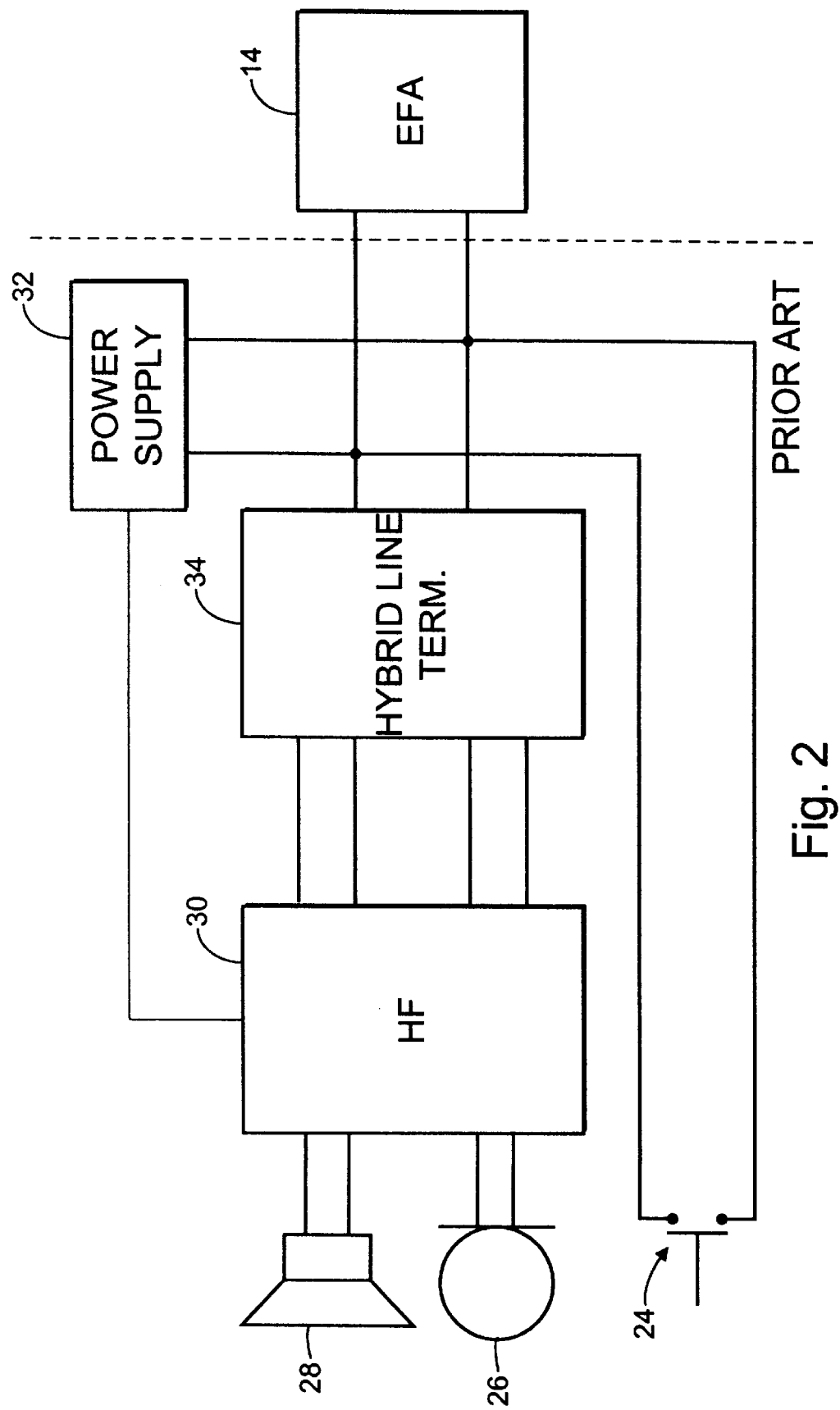
FIG. 2 is a block diagram of a doorphone unit according to the prior art.

Referring to FIG. 2, the doorphone includes a door-bell switch 24, a telephone transmitter 26, a telephone receiver 28, a handsfree control circuit 30, a power supply circuit 32 and a hybrid line termination network 34.

The telephone transmitter 26 includes a microphone for use in a telephone system and the telephone receiver 28 includes an earphone for use in a telephone system. The telephone transmitter and receiver may be panel mounted or may be included within a handset operable to be hand-held by an operator.

The telephone transmitter 26 and telephone receiver 28 are in communication with the handsfree control circuit 30, which itself is in communication with the hybrid line termination network 34. The handsfree control circuit 30 acts to send audio signals produced by the telephone transmitter 26 through the hybrid line termination network 34 to the extended features adapter 14 and to receive and provide to the telephone receiver 28, audio signals provided by the extended features adapter 14. The doorphone 12 is thus in two-way communication with the extended features adapter 14.

The power supply circuit 32 filters direct current power which is provided to it by the extended features adapter 14, to produce filtered current, which is used to supply power to the handsfree control circuit 30.

Extended Features Adapter

FIG. 3

Figure 3:
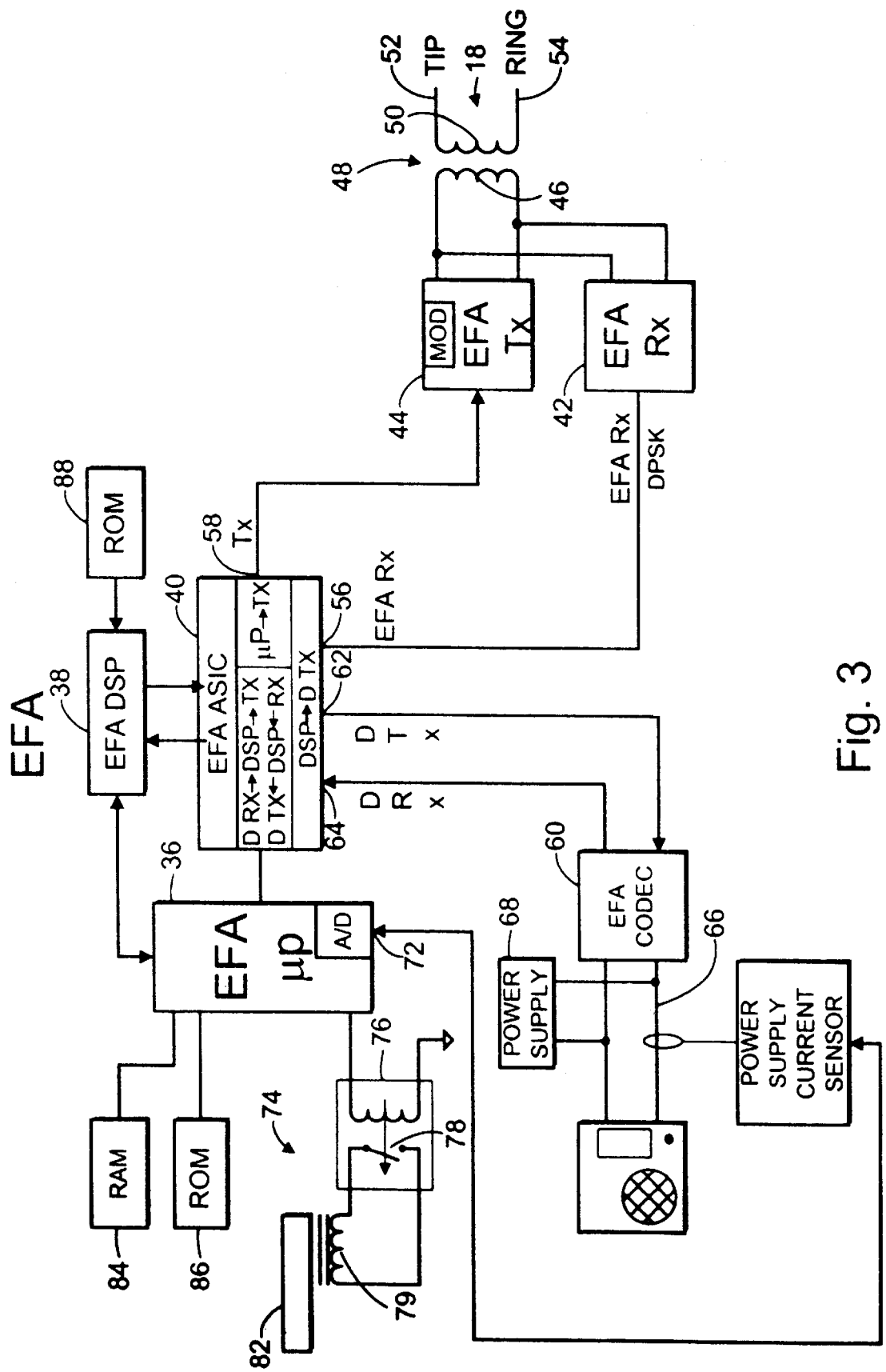
FIG. 3 is a block diagram of an extended features adapter according to the first embodiment of the invention.

Referring to FIG. 3, the extended features adaptor includes an EFA microprocessor 36, an EFA digital signal processor 38, and an EFA application specific integrated circuit (ASIC) 40, all in communication with each other. To the EFA ASIC 40 is connected an EFA message receiver 42 and an EFA message transmitter 44 which are connected to a first winding 46 of an EFA coupling transformer 48. A second winding 50 of the EFA coupling transformer 48 is connected to conventional tip and ring signal lines 52 and 54 of the central office line 18. The EFA message receiver 42 is operable to receive analog dual-phase shift keyed signals from the EFA coupling transformer 48 and to produce at an output thereof digital EFA receive message signals representing signals received at the transformer. These signals are received at an EFA Rx input 56 of the EFA ASIC 40.

The EFA message transmitter 44 is operable to receive EFA message signals from an EFA ASIC Tx output 58 and to modulate the EFA message signals using a DPSK modulating scheme to produce a modulated message signal on a local communications channel operating on a carrier frequency of approximately 2 MHz. The EFA coupling transformer 48 couples the modulated EFA message signal to the central office line 18. The transmitter is then connected to the central office line such that messages are transmitted to all of the telephone stations connected to the central office line, via the local communications channel. The central office line 18 is comprised of a twisted pair, and therefore, the 2 MHz carrier is attenuated over long distances and therefore is severely attenuated by the time the signal reaches the central office. Thus, most of the energy of local communications signals is concentrated locally on the central office line 18.

A first EFA codec 60 is in communication with the EFA ASIC via doorphone transmit and receive signal terminals 62 and 64 and is in communication with the doorphone via remote intercom signal lines 66. The EFA codec 60 is operable to produce digital transmit and receive signals corresponding to analog transmit and receive signals on the remote intercom signal lines 66.

The EFA further includes a power supply 68 for supplying direct current power to the doorphone on the remote intercom signal lines 66. A power supply current sensor 70 includes a current mirror circuit (not shown) connected to a current to voltage converter (not shown), which produces a voltage signal having a voltage proportional to the direct current sensed in the remote intercom signal lines. The voltage signal is presented to an analog to digital converter input 72 of the EFA microprocessor 36 to produce a digital measured current value corresponding to the current sensed in the remote intercom signal lines.

The EFA microprocessor 36 is further in communication with a relay drive circuit 74 operable to drive a relay 76 having contacts 78 for operating a solenoid 79 for mechanically actuating a door control element, which, in this embodiment, includes a door latch 82.

The EFA ASIC 40 includes circuitry for placing the EFA microprocessor 36, the EFA DSP 38, the EFA codec 60 and EFA message transmitter 44 and EFA message receiver 42 in communication with each other. The EFA ASIC 40 therefor has various modes of configuration. In a first mode, the EFA DSP 38 is connected to the DTx terminal 62 and is operable to generate and provide to the EFA codec 60 a tone signal. In a second mode, the EFA DSP 38 is placed in communication with the EFA message transmitter 44 and EFA message receiver 42 and is used to encode and decode signals on the local communications channel. In a third mode, the EFA DSP 38 is placed in communication with the EFA message transmitter 44 and EFA message receiver 42 and is further placed in communication with the EFA codec 60 such that audio signals received from the receive signal terminal 64 are filtered by the EFA DSP 38 and sent as audio messages to the EFA message transmitter 44 for transmission on the local communications channel. Similarly, audio messages received at the EFA message receiver 42 are filtered by the EFA DSP 38 and forwarded to the EFA codec 60 for transmission to the doorphone. Selection of the mode in which the EFA ASIC operates is determined by control registers (not shown) which are readable and writable by the EFA microprocessor 36.

The EFA microprocessor 36 is in communication with EFA RAM 84 and EFA microprocessor ROM 86 and the EFA DSP 38 is in communication with EFA DSP ROM 88. The EFA RAM 84 is used for temporary storage of variables. The EFA microprocessor ROM 86 is used to store sets of instruction codes for directing the EFA microprocessor 36 to perform various functions described below. The DSP ROM 88 is used to store filter routines, gain/loss routines and waveform generation routines.

Telephone Stations

FIG. 4

Figure 4:
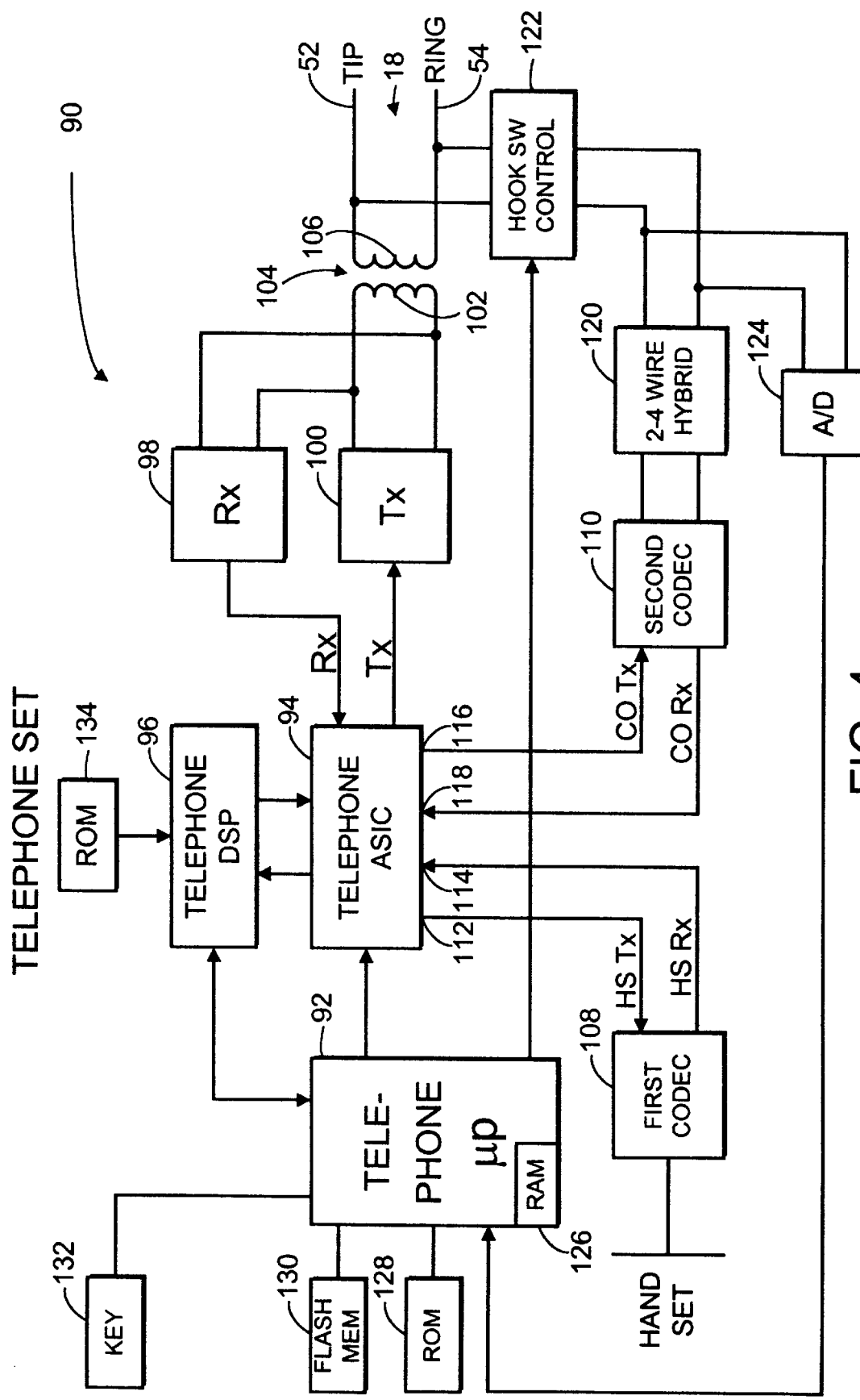
FIG. 4 is a block diagram of a telephone set according to the first embodiment of the invention.

Referring to FIG. 4, one of the telephone stations 90 in the plurality of telephone stations includes a telephone microprocessor 92, a telephone ASIC 94 and a telephone DSP 96, all in communication with each other. To the telephone ASIC 94 is connected a telephone message receiver 98 and telephone message transmitter 100 which are connected to a first winding 102 of a telephone coupling transformer 104. The telephone coupling transformer 104 has a second winding 106 which is connected to conventional tip and ring signal lines 52 and 54 of the central office line 18. The telephone message receiver is operable to receive messages on the local communications channel and the telephone message transmitter is operable to transmit messages on the local communications channel.

Also connected to the telephone ASIC 94 are first and second telephone codecs 108 and 110. The first telephone codec 108 is in communication with a handset (not shown) of the telephone and has handset transmit and handset receive signal lines which are connected to corresponding inputs 112 and 114 of the telephone ASIC 94. The second telephone codec 110 is connected to the telephone ASIC 94 by a central office transmit line 116 and a central office receive line 118 and is further connected to a telephone hybrid line transmission circuit 120 which is connected to the central office line 18 through a hookswitch controller 122 controlled by the telephone microprocessor 92. The central office line 18 is further connected to a telephone analog to digital converter 124 which is connected to the telephone microprocessor 92.

The telephone ASIC 94 includes circuitry for placing the telephone microprocessor 92, the telephone DSP 96, the first and second telephone codecs 108 and 110 and telephone message transmitter 100 and telephone message receiver 98 in communication with each other. The telephone ASIC 94 therefore also has various modes of configuration. In a first mode, the telephone DSP 96 is connected to the telephone message receiver 98 and message transmitter 100 to receive and transmit messages on the local communications channel. At the same time the telephone DSP 96 is connected to the second codec 110 to independently transmit and receive conventional telephone communications signals on the conventional telephonic communications channel. In a second mode, the telephone DSP 96 is placed in communication with the first codec 108 and the telephone message transmitter 100 and telephone message receiver 98 to enable signals produced at the handset to be formatted into messages and sent to the EFA on the local communications channel. In addition, this mode allows audio messages received from the local communications channel to be converted into audio signals which are forwarded to a receiver in the handset, thereby allowing a user of the telephone to communicate with a person using the doorphone. The third mode connects the first codec 108 to the second codec 110 to place the handset in communication with the central office line 18 to permit the telephone to function as a conventional telephone. Selection of the mode in which the telephone ASIC 94 operates is determined by telephone ASIC control registers (not shown) which are readable and writable by the telephone microprocessor 92.

In this embodiment, the telephone microprocessor 92 has internal RAM 126, external ROM 128 and external flash memory 130 and is operable to receive input from a telephone keypad 132.

The internal RAM 126 is used for temporary storage of variables while the external flash memory 130 is used to store a directory list of telephone numbers programmable by the user.

FIG. 5

Figure 5:
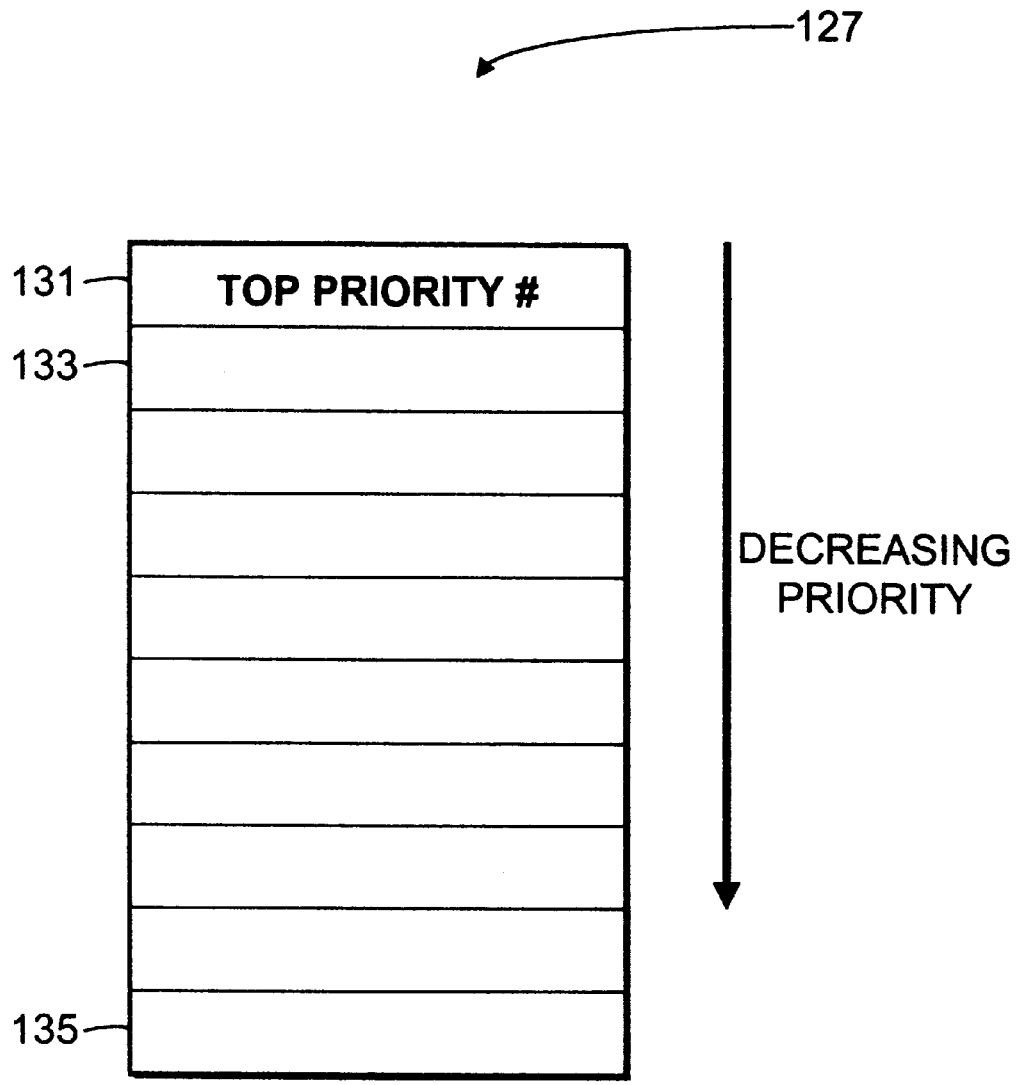
FIG. 5 is a schematic diagram of a directory list of telephone numbers programmable by the user according to the first embodiment of the invention.

Referring to FIG. 5, the directory list of telephone numbers programmable by the user is shown generally at 127. The list includes a plurality of list positions 131, 133, 135, etc. which are associated with registers in RAM for storing telephone numbers operable to automatically be dialled by the telephone set. The positions define the priority with which the corresponding telephone numbers are to be dialled by the telephone and, therefore, the number with highest priority is stored in position 131 and the number with the least priority is stored in position 135. The telephone microprocessor 92 is thus programmed to position each of the predetermined telephone numbers in the list such that the predetermined telephone numbers are prioritized by their respective positions in the list. Numbers are entered into the list when the user presses keys on the key pad 132 shown in FIG. 4, in a directory storage mode.

The external ROM 128 is used to store sets of instruction codes for directing the telephone microprocessor to perform various functions described below. A telephone DSP ROM 134 is used to store filter routines, gain/loss routines and waveform generation routines.

Figure 6:
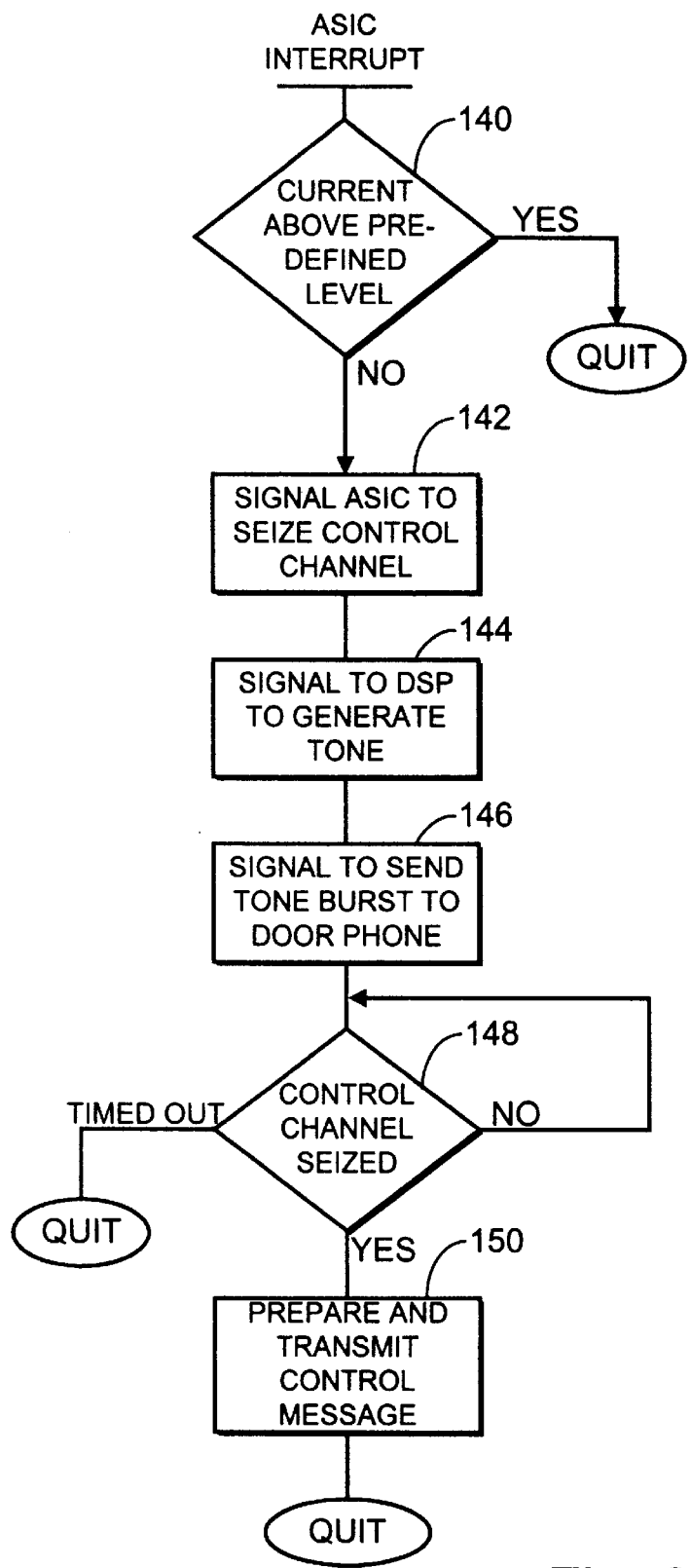
FIG. 6 is a flow chart illustrating an EFA message subroutine according to the first embodiment of the invention.

EFA Control Message Subroutine
FIG. 6

The EFA control message subroutine is run by the EFA microprocessor 36, in response to a timer interrupt. Referring to FIG. 6, the subroutine includes a first block of code 140 which directs the EFA microprocessor 36 to read the analogue to digital converter to determine whether the current measured by the power supply current sensor is above a predefined level. If the current is not above the predefined level, the subroutine is ended. Otherwise, block 142 directs the EFA microprocessor 36 to cooperate with the EFA DSP 38 and the EFA ASIC 40 to seize a control channel on the local communications channel.

The local communications channel is time division multiplexed into five sub-channels including a control channel and four audio sub-channels. The control sub-channel operates on a token passing scheme and, therefore, the act of seizing the control channel is the act of obtaining the token of the control channel, in the conventional manner. After the seizing the control channel, block 144 directs the EFA microprocessor 36 to signal the EFA DSP 38 to generate an approximately 1 KHz tone. Block 146 directs to EFA microprocessor to configure the EFA ASIC 40 into the first mode where the DSP is connected to the DTx connection to the EFA codec 60 such that the tone is sent via the EFA codec 60 to the doorphone.

After sending the tone to the doorphone, block 148 directs the EFA microprocessor to determine whether or not the control channel has been successfully seized. If not, the EFA microprocessor 36 continually checks to determine whether or not the control channel is seized or, in the event that the channel is not seized in a predetermined time, say 1 second, the EFA message subroutine is ended.

FIG. 7

Figure 7:
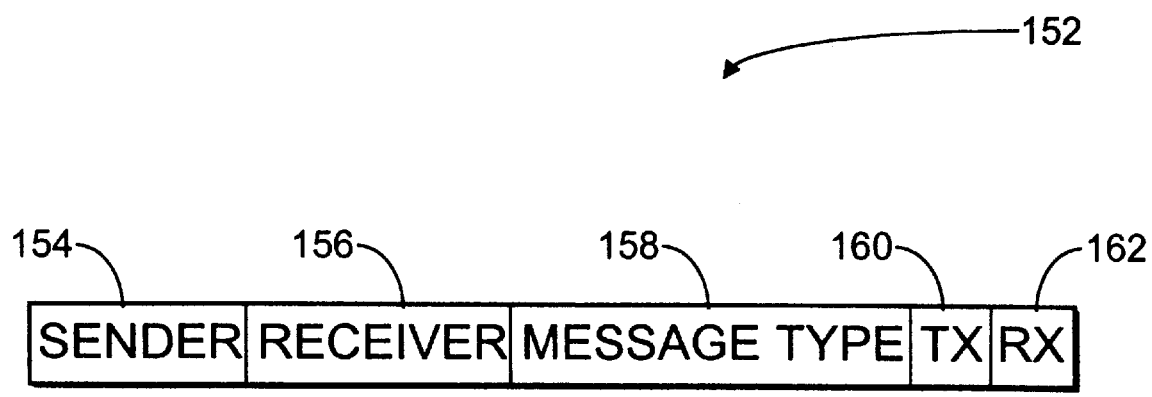
FIG. 7 is a EFA message format according to the first embodiment of the invention.

If the control channel is successfully seized, block 150 directs the EFA microprocessor 36 to prepare and transmit a control message. A control message is prepared in a transmit buffer shown in FIG. 7, shown generally at 152. The message transmit buffer includes a sender field 154, a receiver field 156, a message type field 158, a transmit channel field 160 and a receive channel field 162. The sender field 154 is for holding an address of the sender, in this case the EFA. The receiver field is for holding an address of the intended recipient of the message which may be any of the telephone stations, or may be all of the telephone stations, if the receiver field is set to a global response value. The message type field 158, is for holding a code representing a message type, in this embodiment at this time, a request for intercom communications message. The transmit and receive channel fields 160 and 162 are for holding values representing local communications channel audio sub-channels for transmit and receive portions of audio. The EFA control message subroutine does not load the transmit and receive channel fields 160 and 162 as these have no significance with respect to the request for intercom communications message.

Message Receiving Routine at the Telephone
FIG. 8

Figure 8A:
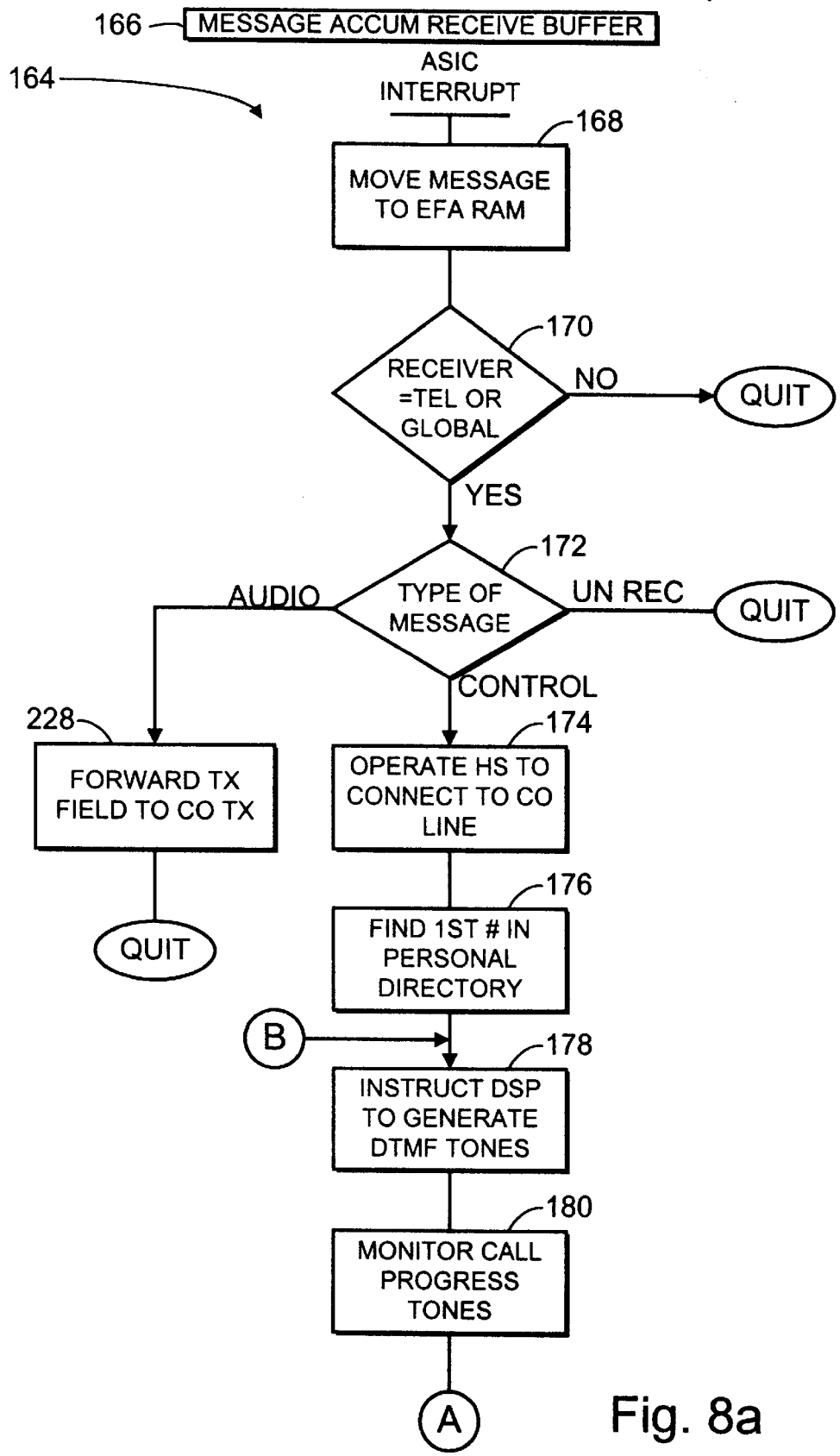
FIG. 8a is a first portion of a flowchart representing a message receiving routine at the telephone set according to the first embodiment of the invention.

The message receiving routine at the telephone is shown generally at 164 in FIG. 8*a*. This routine is entered upon receiving an ASIC interrupt from the telephone ASIC 94 in response to a message received in a message accumulating receive buffer 166 in the ASIC. The routine begins with block 168 which directs the telephone microprocessor 92 to move the contents of the message accumulating receive buffer 166 into the RAM 126 in the telephone microprocessor 92. Block 170 then directs the telephone microprocessor 92 to determine whether or not the contents of the receiver field of the message correspond to the telephone running the message receiving routine. If not, then the message receiving routine is ended. Otherwise, block 172 directs the telephone microprocessor to read the message type field to determine whether the message is a control message, an audio message or unrecognizable. If the message is unrecognizable, the message receiving routine is ended. If the message is recognized as a control message, however, block 174 directs the telephone microprocessor to signal the hookswitch controller 122 to connect the hybrid line transmission circuit 120 to the central office line 18. Block 176 then directs the telephone microprocessor to read the flash memory 130 to determine the first number contained in the personal directory list of numbers shown in FIG. 5. Block 178 then directs the microprocessor 92 to signal the telephone DSP 96 to generate DTMF tones corresponding to the first number in the personal directory.

To this point, therefore, the EFA acts as an interface for detecting actuation of the doorbell switch and for signalling at least one telephone station by transmitting a control message on the local communications channel, to place a telephone call in response to actuation of the doorbell switch. The DSP acts as a dialler for dialling the predetermined telephone number stored in the personal directory.

Referring back to FIG. 8*a*, block 180 then directs the telephone microprocessor 92 to monitor call progress tones received from the central office, through the second codec 110 and the telephone ASIC and DSP.

FIG. 8*b*

Referring to FIG. 8*b*, block 182 directs the telephone microprocessor 92 to determine whether or not the call progress tones indicate that a busy signal is received. If the busy signal is not received, block 184 directs the telephone microprocessor 92 to determine whether or not the call progress tones indicate that the number dialled by the DTMF tones has produced an answer signal. If an answer signal is received or if an answer signal is not received within a specified time (5 seconds) or if a busy signal is received at block 182, block 185 directs the microprocessor to find the next telephone number in the personal directory list and processing continues at point B in FIG. 8*a*.

The next number in the personal directory list is, of course, the number with the next highest priority. Thus, the microprocessor and DSP act as a call progress tone detector for detecting call progress tones on the central office line to determine the status of the telephone call in response to the call progress tones. The telephone microprocessor and DSP also act to dial a predetermined telephone number with a lower priority when call progress tones indicate no telephonic communication has been established after dialling a predetermined telephone number with a higher priority. Thus, the processor is programmed to call the predetermined telephone numbers in order of decreasing priority in response to actuation of the switch at the door phone.

If, during execution of block 184, the microprocessor detects that an answer signal is received, block 186 directs the telephone microprocessor 92 to compose an acknowledgement message in a telephone message transmit buffer 188. The telephone message transmit buffer 188 has the same format as the EFA message transmit buffer including a sender/receiver message type transmit channel and receive channel fields 190, 192, 194, 196 and 198, respectively. To compose the acknowledgement message, the sender field 190 is loaded with a code indicating that the sender is the current telephone, the receive channel field 192 is loaded with a code representing the EFA, the message type field 194 is loaded with an acknowledgment intercom connect code, the transmit channel field 196 is loaded with a value indicating the audio channel on which outgoing audio messages from the telephone to the EFA to be transmitted on and the receive channel field 198 indicates the audio channel on which audio messages from the EFA are to be received.

Block 200 then directs the telephone microprocessor 92 to transmit the contents of the telephone message transmit buffer 188 to the EFA, via the telephone message transmitter 100.

Block 202 then directs the telephone microprocessor 92 to write to the telephone ASIC 94 registers to provide virtual connections between the central office transmit output and the receive input of the telephone ASIC and between the central office receive input 118 of the telephone ASIC 94 and the transmit output of the telephone ASIC. Thus, communication is established between the local communications channel and the telephonic communications channel, both of which are on the same central office line.

Block 204 then directs the telephone microprocessor 92 to set an end conversation flag to be used in other routines. The control message routine is then ended.

Figure 9:
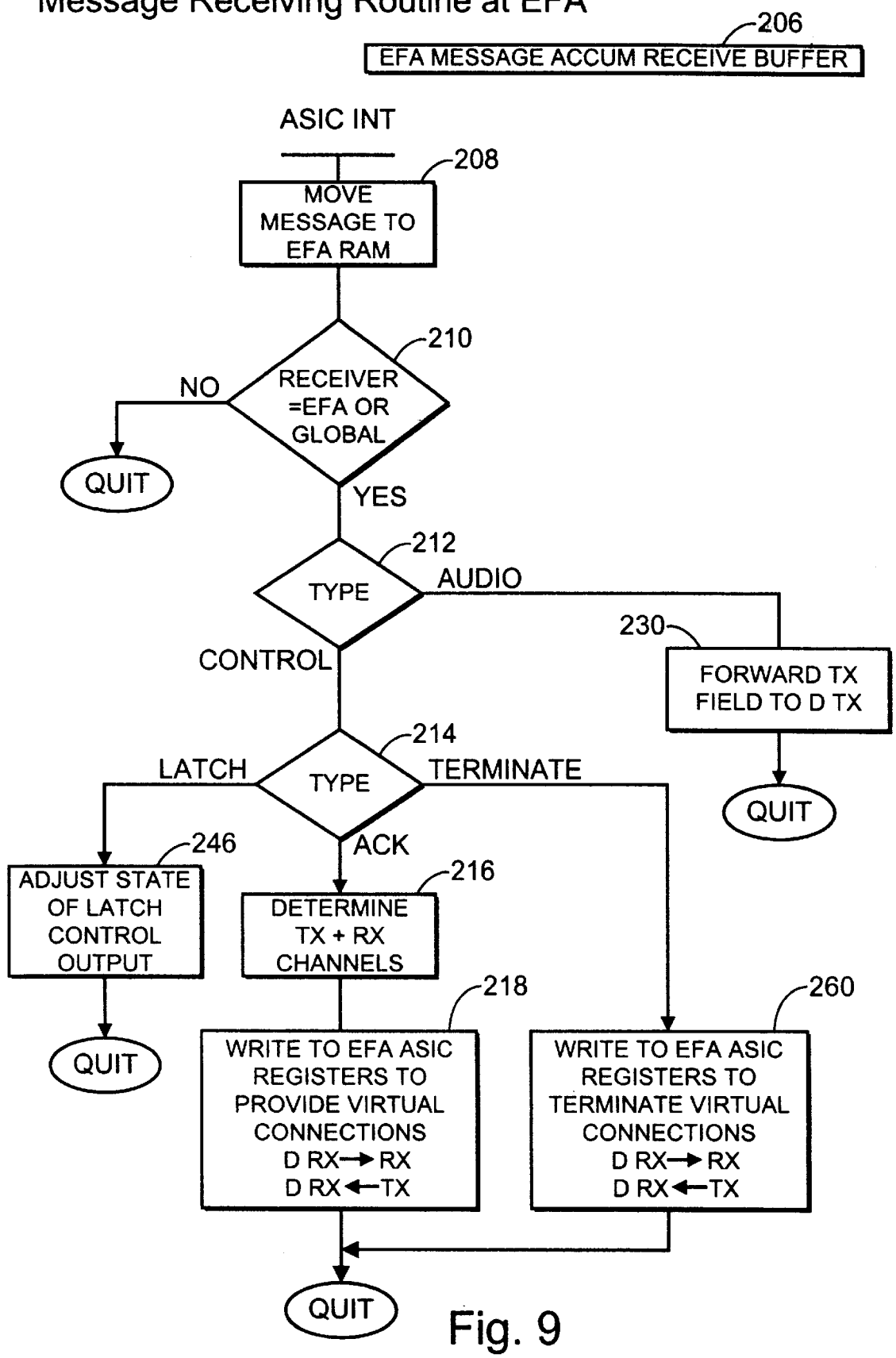
FIG. 9 is a flowchart of a message receiving routine at the extended features adapter according to the first embodiment of the invention.

Message Receiving Routine at EFA
FIG. 9

Referring to FIG. 9, the message receiving routine at the EFA is entered upon receiving an ASIC interrupt, when an EFA message accumulating receive buffer 206 is loaded in response to receipt of a message on the local communications channel, by the EFA message receiver 42.

The message receiving routine at the EFA begins with block 208 which directs the EFA microprocessor 36 to move the contents of the EFA message accumulating receive buffer to the EFA RAM 86. Block 210 then directs the EFA microprocessor 36 to determine whether or not the contents of the receive field of the message correspond to the EFA and if not, the message receiving routine is ended. If so, however, block 212 directs the EFA microprocessor 36 to determine the type of message. If the message type is a control type, block 214 directs the EFA microprocessor 36 to determine whether the message relates to an acknowledgment, latch or terminate message.

At this point in the description of operation, the act of sending an acknowledgement message has been described in connection with FIG. 8b and, therefore, upon receipt of an acknowledgment message at the EFA, block 214 directs the EFA microprocessor 36 to continue processing at block 216 which directs the EFA microprocessor 36 to read the transmit and receive channel codes of the transmit channel and receive channel fields of the message. Block 218 then directs the EFA microprocessor 36 to signal the EFA ASIC to make virtual connections between the EFA codec 60 and the EFA message transmitter and receiver. Thus audio information messages can be passed between at least one of the telephone and the telephone transmitter and receiver positioned near the door. In this manner, communication is established between the local communications channel and the doorphone. With these connections and with the connections formed with block 202 in the control message receiving routine at the telephone shown in FIG. 8b, virtual connections are made between the doorphone and the central office line. This provides for communications between the telephone transmitter and telephone receiver positioned near the door and a remote telephone in communication with the public telephone network. Such communications enable a person using the doorphone to communicate telephonically with a user of a remote telephone. Thus, the occupant of the dwelling can be away from the dwelling, such as at work or on vacation, etc., and may be automatically called by telephone when a person calls at a door of the occupant's dwelling. The occupant can then answer the telephone call, communicate with the person calling at the occupant's dwelling and decide whether or not the person calling should be let into the house or dealt with in another manner.

Figure 10:
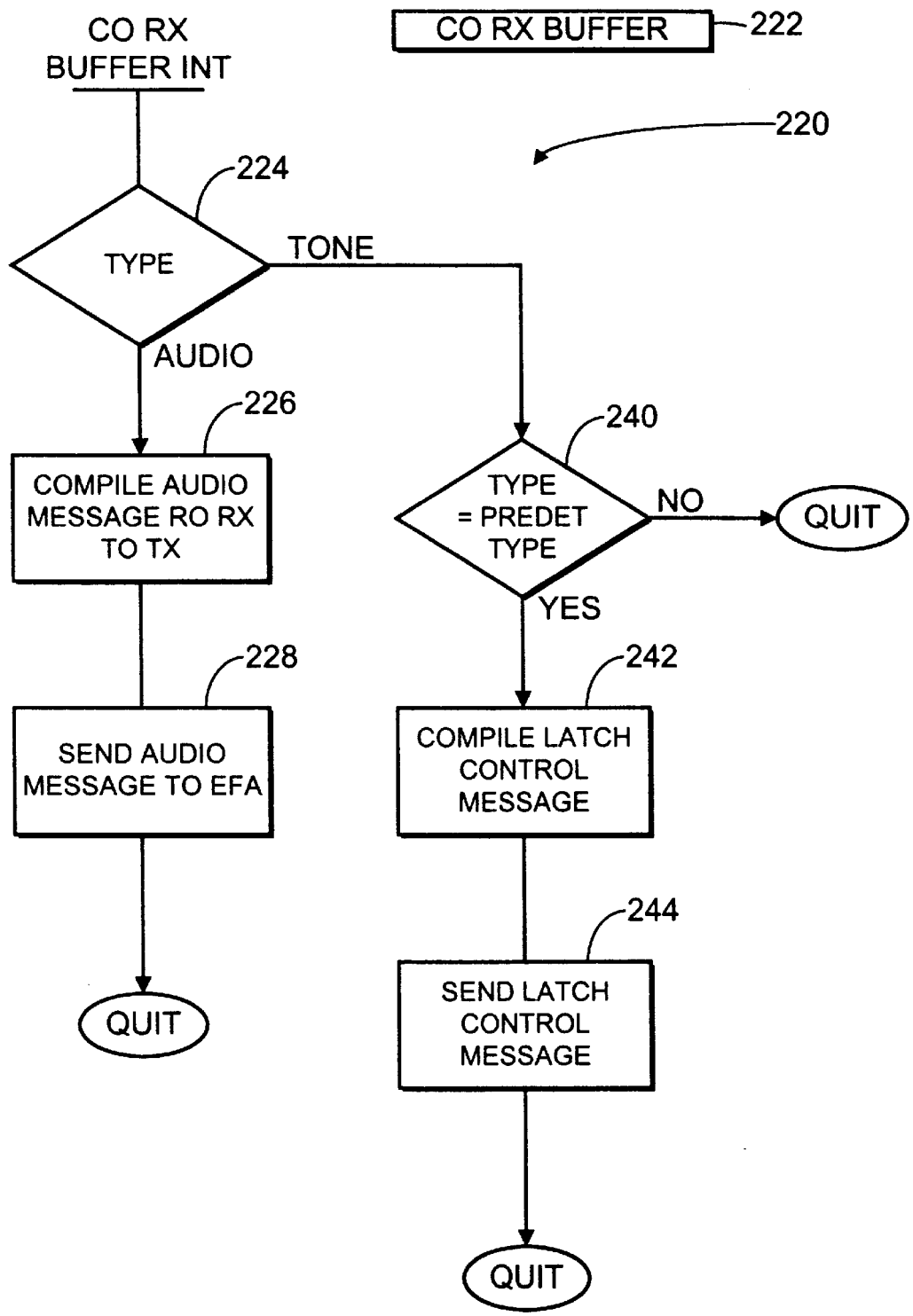
FIG. 10 is a flowchart of a telephone audio to message routine run at the telephone set according to the first embodiment of the invention.

Telephone Audio to Message Routine
FIG. 10

Referring to FIG. 10, the telephone audio to message routine is shown generally at 220 and is run by the telephone microprocessor 92. When conventional telephonic reception signals are received on the tip and ring lines 52 and 54 of the central office line 18, such signals are received through the hybrid line transmission circuit 120 at the second codec 110. The second codec 110 produces digital signals which are received at the central receive input 118 of the telephone ASIC 94 and which are processed and filtered by the telephone DSP 96. The DSP thus acts as a receiver for receiving telephonic reception signals from the central office. Upon receiving filtered values representing signals received from the central office line, the signals are received in the central office receive buffer 222 in the telephone ASIC. The receipt of such signals in this buffer causes the telephone ASIC 94 to interrupt the telephone microprocessor 92 to enter the telephone audio to message routine. Simultaneously with receiving data in the central office receive buffer 222, the telephone DSP 96 also determines whether or not the data received is conventional telephonic audio such as for speech or whether the data relates to a predetermined tone signal produced by the remote telephone. This information is stored in a register (not shown) in the telephone ASIC.

The telephone audio message routine begins with block 224 which directs the telephone microprocessor 92 to determine whether or not the data received from the central office line relates to tone data or audio data. Assuming the data relates to audio data, block 226 directs the telephone microprocessor 92 to compile an audio message in the telephone message transmit buffer 188 shown in FIG. 8b. Referring to FIG. 8b, the sender field is loaded with a code representing the telephone, the receiver field is loaded with a code representing the EFA, the message type field is loaded with a code representing an audio message and the transmit channel field 196 is loaded with contents of the central office receive buffer 222. The contents of the receive channel field 198 are left blank. The telephone microprocessor and DSP thus act as a receive audio message generator for generating a receive audio message in response to telephone reception signals.

Block 228 then directs the telephone microprocessor 92 to send the message loaded in the telephone message transmit buffer through the telephone ASIC and telephone DSP to the message transmitter 100 which places the message on the local communications channel.

Thus, audio signals received on the central office line are formatted into digital audio messages which are transmitted on the local communications channel, to the EFA. The telephone audio to message routine is then ended.

Referring to FIG. 9, at the EFA, a message is received in the EFA message accumulating receive buffer 206 causing an ASIC interrupt to the EFA microprocessor 36 whereupon the EFA microprocessor executes blocks 208 and 210 as described above. When the EFA microprocessor 36 executes block 212, however, the message type is determined to be audio and, therefore, the EFA microprocessor 36 is directed to block 230 which directs the EFA microprocessor 36 to forward the contents of the transmit channel field to the DTx output of the EFA ASIC and hence to the EFA codec 60 which provides analogue signals to the doorphone. Referring to FIG. 2, the handsfree control circuit 30 directs the signals received from the EFA codec 60 as shown in FIG. 3, to the telephone receiver 28. Thus, the EFA DSP and EFA microprocessor act as a receiver for receiving the audio message from the telephone and for providing a representation of the receive audio message to the telephone receiver. Thus, the operator of the doorphone can listen to audio produced at the remote telephone.

Doorphone Response

Referring to FIG. 2, when a caller responds to the audio just heard, the telephone transmitter 26 produces audio signals which are buffered by the handsfree control circuit 30 and which are forwarded to the EFA through the hybrid line termination network 34.

FIG. 11

Figure 11:
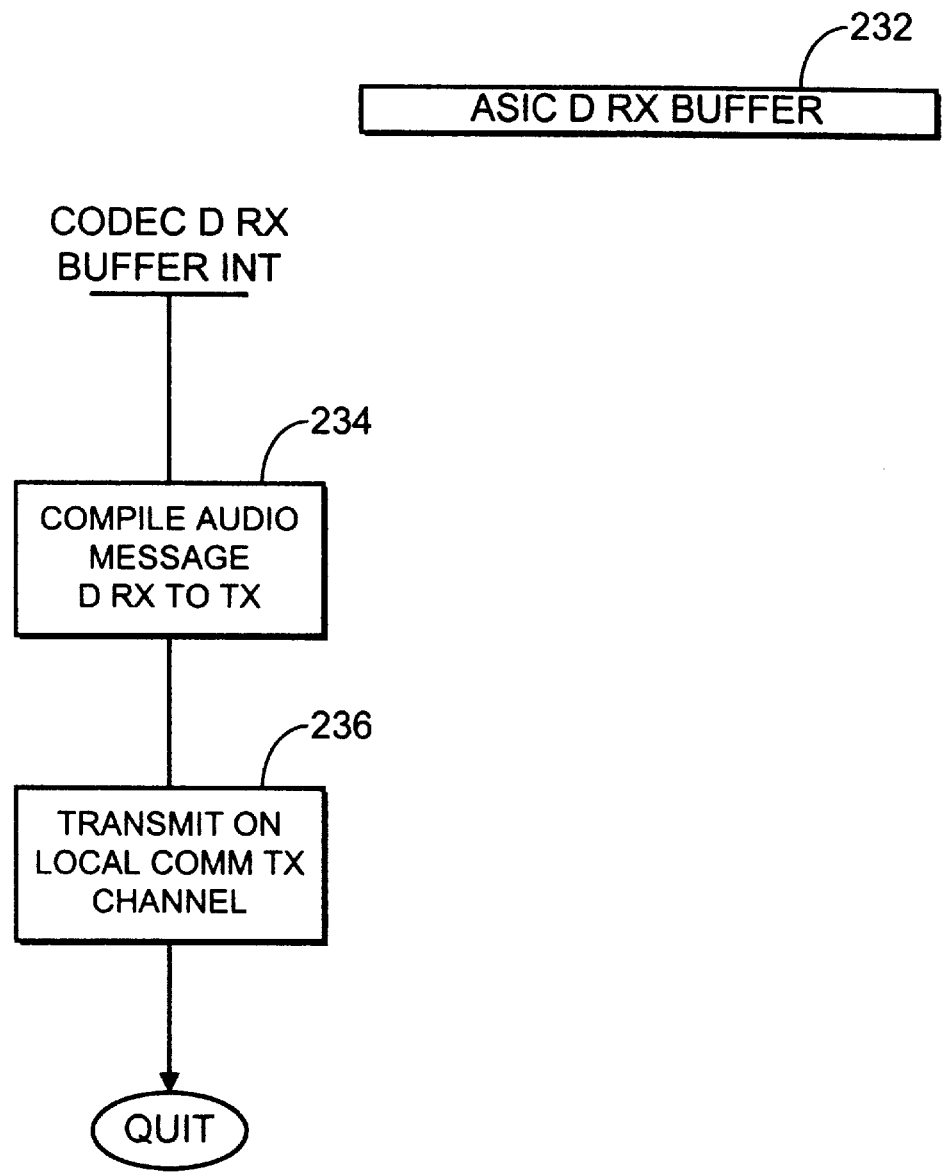
FIG. 11 is a flowchart of an EFA audio to message routine according to the first embodiment of the invention.

Referring to FIG. 3, the audio signals produced by the handsfree control circuit 30 are received at the EFA codec 60 which produces digital signals which are presented to the door receive input 64 at the EFA ASIC 40. Referring to FIG. 11, such signals are received in an ASIC DRx buffer 232, which, when loaded causes an interrupt to be sent from the EFA ASIC 40 to the EFA microprocessor 36 to invoke the EFA audio to message routine. Upon entering the EFA audio to message routine, a first block 234 directs the EFA microprocessor 36 to compile an audio message in the message transmit buffer 152 shown in FIG. 7. The sender field 154 is loaded with a code representative of the EFA, the receiver field 156 is loaded with a code representative of the telephone to receive the message, the message type field 158 is loaded with a code indicating that the message is an audio message and the transmit channel field 160 is loaded with the contents of the ASIC DRx buffer 232. The contents of the receive channel field 162 are ignored. The EFA DSP and EFA microprocessor thus act as a transmit audio message generator for generating a transmit audio message in response to acoustic disturbances detected at the telephone transmitter.

Referring back to FIG. 11, block 236 then directs the EFA microprocessor 36 to signal the EFA ASIC to transmit the contents of the EFA message transmit buffer to the EFA message transmitter 44 which transmits the message on the local communications channel to the telephone.

Referring back to FIG. 8a, at the telephone, the audio message transmitted by the EFA is received in the message accumulating receive buffer 166 which causes an ASIC interrupt to the telephone microprocessor 92, invoking the message receiving routine at the telephone. Blocks 168 and 70 are executed as described above, however, block 172 directs the telephone microprocessor 92 to read the contents of the message type field, which, at this time indicate that the message is an audio message. Therefore, processing continues with block 238 which forwards the contents of the transmit channel field to the central office transmit output 116 of the telephone ASIC 94. Thus, the telephone DSP and telephone microprocessor act as a receiver for receiving the transmit audio message. The signal appearing at the central office transmit output is received at the second codec 110 which converts the signal into an analogue signal and transmits it on the conventional telephonic communications channel on the central office line 18. Thus, the telephone DSP, telephone microprocessor and second codec act to produce telephonic transmission signals in response to the transmit audio message. In addition, the second codec acts as a transmitter for transmitting these telephonic transmission signals to the central office. Thus, at the remote telephone, a re-creation of the audio received at the telephone transmitter 26 in FIG. 2 is received.

Latch Control

In the event that the occupant of the dwelling using the remote telephone determines that the person calling at the doorphone should be let into the dwelling, the occupant may press a predetermined key, such as digit 9 on the remote telephone key pad, which produces a DTMF signal on the central office line 18.

Referring to FIG. 4, the DTMF signal is received through the second codec 110 and is decoded as a DTMF signal by the telephone ASIC and telephone DSP which load a register (not shown) in the telephone ASIC indicating that a DTMF tone has been received. Thus, the telephone DSP acts as a tone detector for detecting a dual-tone multi-frequency signal produced by the remote telephone.

Referring to FIG. 10, when a DTMF tone is received, block 224 directs the telephone microprocessor 92 to execute block 240 which directs the telephone microprocessor 92 to determine whether or not the tone matches a predetermined tone type. If not, then the telephone audio to message routine is ended. Otherwise, block 242 directs the telephone microprocessor 92 to compile a latch control message.

Referring to FIG. 8b, to compile the latch control message, the message transmit buffer is loaded such that the sender field 190 is loaded with an indication of the telephone sending the message, receive channel field 192 is loaded with a code representing the EFA. The message type field 194 is loaded with a latch control message and the transmit channel field 196 is loaded with a latch control code indicating an open/close status of the door latch. The receive channel field 198 is left blank.

Referring back to FIG. 10, block 244 then directs the telephone microprocessor 92 to forward the latch control message to the local communications channel through the ASIC telephone DSP and telephone message transmitter 100. The telephone DSP, telephone microprocessor and telephone message transmitter thus act to transmit to the EFA a latch control message, in response to the dual-tone multi-frequency signal. The telephone audio to message routine is thus completed.

Referring to FIGS. 3 and 9, when a latch control message is received at the EFA, processing at the EFA microprocessor 36 continues as described above in connection with blocks 208 through 212. At block 214, however, the EFA microprocessor 36 determines that the message type is a latch message and block 246 directs the EFA microprocessor 36 to adjust the state of the latch control output according to the latch control code which may cause activation of the latch control relay 76. The door latch 78 is thus retracted and the caller may open the door.

It will be appreciated that locally, at the telephone set in FIG. 4, the door latch may similarly be operated by an operator actuating the appropriate key on the key pad 132 which causes a DTMF signal to be placed on the central office line 18. Such DTMF signal is interpreted the same way whether or not it originates with the remote telephone or at the local telephone and thus, a person operating the local telephone can also cause the door latch to be actuated to enable a person to open the door.

FIG. 12

Figure 12:
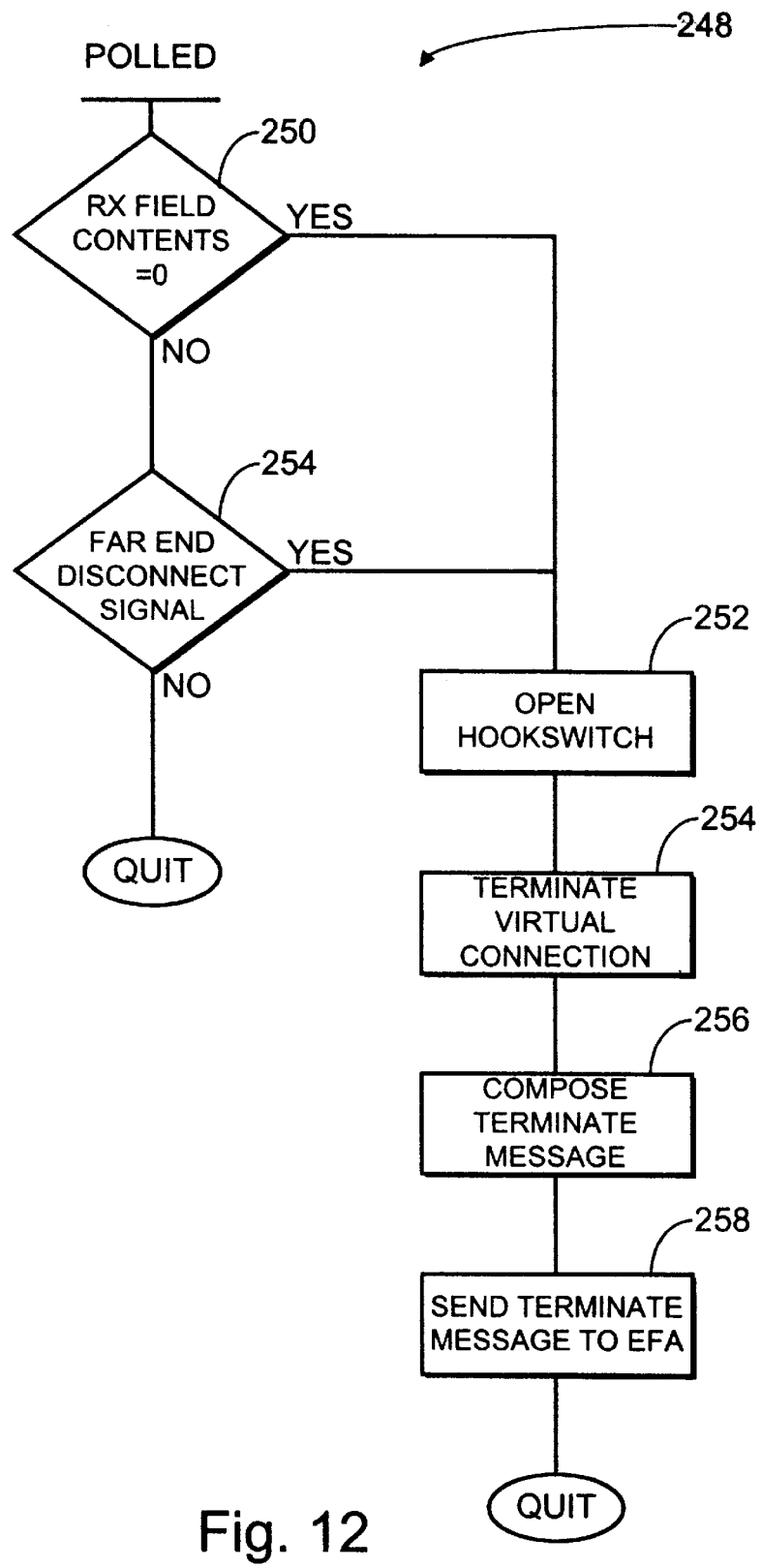
FIG. 12 is a flowchart of a telephone disconnect routine according to the first embodiment of the invention.

Referring back to FIG. 8b, at block 204, the telephone microprocessor 92 was directed to set an end conversation flag. Referring to FIGS. 4 and 12, when this flag is set, the telephone microprocessor 92 periodically enters a telephone disconnect routine 248. This routine includes a first block 250 which directs the telephone microprocessor 92 to read the contents of the central office receive buffer 222 shown in FIG. 10 and if the contents of that buffer indicate that the central office line has been idle for a predetermined time, processing continues with block 252. On the other hand, if there is a far end disconnect signal, block 254 directs the telephone microprocessor 92 to continue processing with block 252. If the contents of the central office receive buffer 222 in FIG. 10 do not indicate the line is idle or the far end disconnect signal is received, the telephone disconnect routine 248 is ended.

When the telephone microprocessor 92 executes block 252, the telephone microprocessor is directed to send a signal to the hookswitch controller 122 which opens the hookswitch connection between the central office line and the second codec 110.

Next, block 254 directs the telephone microprocessor 92 to cancel the virtual connections between the second codec and the message receiver and transmitter 98 and 100. Thus, communication between the local communications channel and the telephonic communications channel are broken.

Block 256 then directs the telephone microprocessor 92 to compose a terminate message. To do this, referring to FIG. 8b, the telephone message transmit buffer 188 is loaded as follows. The sender field 190 is loaded with a code indicating the telephone set. The receiver field 192 is loaded with a code indicating the EFA. The message type field 194 is loaded with a terminate intercom call message and the transmit and receive channel fields 196 and 198 are left empty.

Referring back to FIGS. 4 and 12, block 258 then directs the telephone ASIC 94 and telephone DSP 96 to cause the telephone message transmitter 100 to transmit the terminate intercom call message on the local communications channel.

Referring to FIGS. 3 and 9, when the terminate intercom call message is received at the EFA, the message is received in the EFA message accumulating receive buffer 206 which causes the EFA ASIC 40 to interrupt the EFA microprocessor 36 and invoke the message receiving routine at the EFA. The message receiving routine executes blocks 208 through 212 as described above, however, at block 214, the EFA microprocessor 36 recognizes the message as a terminate intercom call message and processing is directed to block 260 which directs the EFA microprocessor 36 to write to the EFA ASIC 40 to terminate the virtual connection between the EFA codec 60 and the EFA message transmitter and receiver 44 and 42. Communication between the doorphone and the local communications channel therefore is terminated.

Referring back to FIG. 12, after sending the terminate message to the EFA, the telephone disconnect routine is ended and the telephone microprocessor 92 returns to conventional routines for implementing standard telephone features.

It will be appreciated that as the doorphone is positioned near the door 21 of the dwelling, the switch 24 and the telephone transmitter and receiver 26 and 28 are also positioned near the door 21. The EFA acts as a transmitter and a receiver for passing audio information messages between at least one of the telephones and the telephone and receiver positioned near the door when a telephone call is established. Thus, communications can be established between a person calling at the door and a person located at a remote telephone virtually anywhere in the world. The caller at the door will have no idea that the person answering through the doorphone is away from the dwelling and, therefore, a would-be burglar would be foiled into believing that the occupant is in the dwelling. This provides an added level of security, while the occupant is away.

While specific embodiments of the invention have been described and illustrated, such embodiments should be considered illustrative of the invention only and not as limiting the invention as construed in accordance with the accompanying claims.

What is claimed is:

1. An apparatus for remotely answering a door, the apparatus comprising:

a) a switch positioned near said door;

b) a telephone transmitter and receiver near the door;

c) an interface in communication with said switch and with a central office line for transmitting a signal message on said central office line, in response to actuation of said switch; and d) a telephone station connected to said central office line and responsive to said signal message on said central office line from said interface to place a telephone call on said central office line to a remote telephone and to establish communications on said central office line between said telephone transmitter and receiver and said remote telephone.

2. An apparatus as claimed in claim 1 wherein said telephone station includes a dialler for dialling a pre-determined telephone number.

3. An apparatus as claimed in claim 2 further including a) a processor in communication with said dialler;

b) directory memory in communication with said processor;

c) a user input device in communication with said processor; and d) said processor being programmed to store in said directory memory a list of pre-determined telephone numbers entered at said user input device and to call at least one of said pre-determined telephone numbers in response to actuation of said switch.

4. An apparatus as claimed in claim 3 wherein said processor is programmed to prioritize said pre-determined telephone numbers.

5. An apparatus as claimed in claim 4 wherein said processor is programmed to call said pre-determined telephone numbers in order of decreasing priority in response to actuation of said switch.

6. An apparatus as claimed in claim 5 wherein said processor is programmed to call a pre-determined telephone number with a lower priority, after a pre-determined telephone number with a higher priority has been dialled and no telephonic communication has been established after dialling said pre-determined telephone number with said higher priority.

7. An apparatus as claimed in claim 6 wherein said processor is programmed to position each of said pre-determined telephone numbers in said list such that said pre-determined telephone numbers are prioritized by their respective positions in said list.

8. An apparatus as claimed in claim 6 further including a call progress tone detector in communication with said processor, for detecting call progress tones on a central office line and wherein said processor is programmed to determine the status of said telephone call in response to said call progress tones and to dial said pre-determined telephone number with a lower priority when said call progress tones indicate no telephonic communication has been established after dialling said pre-determined telephone number with said higher priority.

9. An apparatus as claimed in claim 1 wherein said interface includes a transmitter for transmitting a control message to said telephone station in response to actuation of said switch to signal said telephone station to place said telephone call.

10. An apparatus as claimed in claim 9 wherein said transmitter is connected to said central office line such that said control message is transmitted to said telephone station on said central office line.

11. An apparatus as claimed in claim 1 further including a transmit audio message generator for generating a transmit audio message in response to acoustic disturbances detected at said telephone transmitter.

12. An apparatus as claimed in claim 11 wherein said interface includes a transmitter for transmitting said transmit audio message to said telephone station.

13. An apparatus as claimed in claim 12 wherein said telephone station includes a receiver for receiving said transmit audio message and for producing telephonic transmission signals in response to said transmit audio message.

14. An apparatus as claimed in claim 13 wherein said telephone station includes a transmitter connected to said central office line, for transmitting said telephonic transmission signals to a central office on said central office line.

15. An apparatus as claimed in claim 11 wherein said telephone station includes a receiver for receiving telephonic reception signals from a central office on said central office line.

16. An apparatus as claimed in claim 15 wherein said receiver includes a receive audio message generator for generating a receive audio message in response to said telephonic reception signals.

17. An apparatus as claimed in claim 16 wherein said telephone station includes a transmitter for transmitting said receive audio message to said interface.

18. An apparatus as claimed in claim 17 wherein said interface includes a receiver for receiving said receive audio message and for providing a representation of said receive audio message to said telephone receiver.

19. An apparatus as claimed in claim 1 further including a plurality of telephone stations connected to said central office line.

20. Ai apparatus as claimed in claim 19 wherein said interface includes a transmitter connected to said central office line for transmitting a control message on said central office line to each of said telephone stations of said plurality of telephone stations in response to actuation of said switch to signal at least one of said telephone stations to place said telephone call.

21. An apparatus as claimed in claim 20 wherein said transmitter is connected to said central office line such that said control message is transmitted to all of said telephone stations on said central office line.

22. An apparatus as claimed in claim 1 further including:
a) a tone detector in said telephone station for detecting a dual tone multi-frequency signal produced by said remote telephone;
b) a message transmitter for transmitting a message from said telephone station to said interface in response to said dual tone multi-frequency signal;
c) a message receiver at said interface for receiving said message; and
d) a door control element in communication with said message receiver, said door control element being actuated in response to said message received at said message receiver.

23. A method of remotely answering a door, the method comprising:
a) transmitting a signal on a central office line to a telephone station connected to said central office line, in response to actuation of a switch positioned near the door;
b) placing a telephone call from said telephone station, on said central office line to a remote telephone in response to said signal transmitted to said telephone station on said central office line; and
c) establishing communications through said telephone station, between said remote telephone and a telephone transmitter and receiver positioned near said door, in response to said signal.

24. A method as claimed in claim 23 further including the step of establishing communication between said telephone station and said telephone transmitter and receiver.

25. A method as claimed in claim 24 wherein the step of placing said telephone call includes the step of establishing said telephone call between said telephone station and a central office.

26. A method as claimed in claim 24 further including the step of dialling, at said telephone station, said pre-determined telephone number.

27. A method as claimed in claim 25 further including the steps of:
a) producing, at an interface connected to said telephone transmitter and receiver and said telephone station, a representation of acoustic disturbances detected at said telephone transmitter;
b) producing a transmit audio message, at said interface, in response to said representation of acoustic disturbances;
c) transmitting said transmit audio message;
d) receiving said transmit audio message at said telephone station;
e) producing telephonic transmission signals in response to said transmit audio message; and
f) transmitting said telephonic transmission signals to a central office on said central office line.

28. A method as claimed in claim 27 further including the steps of:
a) receiving, at said telephone station, telephonic reception signals from said central office;
b) producing and transmitting a receive audio message representation in response to said telephonic reception signals;
c) receiving said receive audio message representation; and
d) actuating said telephone receiver in response to said receive audio message representation.

29. A method as claimed in claim 25 further including the step of transmitting, a control message on said central office line, to a plurality of telephone stations in response to actuation of said switch.

30. A method as claimed in claim 29 further including the step of receiving said control message at at least one of said telephone stations and placing said telephone call from said at least one telephone station in response to said control message.

31. A method as claimed in claim 29 further including the step of generating said control message at an interface connected to said telephone transmitter and receiver and transmitting said control message from said interface to said at least one telephone station.

32. A method as claimed in claim 23 further including the step of maintaining a list of pre-determined telephone numbers to call in response to actuation of said switch.

33. A method as claimed in claim 32 further including the a step of prioritizing said pre-determined telephone numbers and wherein said pre-determined telephone numbers are called in order of decreasing priority in response to actuation of said switch.

34. A method as claimed in claim 33 further including the step of calling a pre-determined telephone number with a lower priority, after a pre-determined telephone number with a higher priority has been dialled and no telephonic communication has been established after dialling said pre-determined telephone number with said higher priority.

35. A method as claimed in claim 34 further including the step of positioning each of said pre-determined telephone numbers in said list such that said pre-determined telephone numbers are prioritized by their respective positions in said list.

36. A method as claimed in claim 34 further including the step of monitoring call progress tones on a central office line to determine the status of said telephone call and dialling said pre-determined telephone number with a lower priority when said call progress tones indicate no telephonic communication has been established after dialling said pre-determined telephone number with said higher priority.

37. A method as claimed in claim 23 further including the step of transmitting a control message to said telephone station in response to actuation of said switch and placing said telephone call in response to said control message received at said telephone station.

38. A method as claimed in claim 37 further including the step of generating said control message at an interface connected to said telephone transmitter and receiver and transmitting said control message from said interface to said telephone station.

39. A method as claimed in claim 38 wherein transmitting said control message includes transmitting said control message on said central office line.

40. A method as claimed in claim 23 further including the step of actuating a door control element in response to signals produced by said remote telephone.

41. A method as claimed in claim 40 further including the step of receiving dual tone multi-frequency signals at said telephone station in communication with an interface for actuating said door control element in response to said dual tone multi-frequency signals.

42. A method as claimed in claim 41 further including the steps of:
a) producing, at said telephone station, a door control message in response to said dual tone multi-frequency signals;
b) transmitting said door control message to said interface;
c) receiving said door control message and producing a control element signal representation; and
d) actuating said door control element in response to said control element signal representation.

43. An apparatus for signalling the actuation of a door bell switch, the apparatus comprising:
a) a central office line supporting telephonic communications on a telephonic communications channel;
b) a plurality of telephones connected to said central office line;
c) a door bell switch; and
d) an interface operable to transmit a control message on a local communications channel on said central office line, in response to actuation of said switch, said local communications channel being separate from said telephonic communications channel.

44. An apparatus as claimed in claim 43 further including a receiver for receiving said control message at at least one of said telephones.

45. An apparatus as claimed in claim 44 further including a dialler for dialling on said central office line a pre-determined telephone number of a remotely located telephone, in response to said control message.

46. An apparatus as claimed in claim 45 further including a processor for monitoring call progress signals on said central office line to determine whether or not a telephone call is established as a result of dialling said pre-determined telephone number.

47. An apparatus as claimed in claim 46 further including a transmitter and a receiver for passing audio information messages between said at least one of said telephones and a telephone transmitter and receiver positioned near said door when a telephone call is established.

48. An apparatus as claimed in claim 47 further including a signal processor for converting said audio information messages received at said telephone, to telephone transmission signals for transmission on said telephonic communications channel.

49. An apparatus as claimed in claim 48 wherein said signal processor is operable to convert telephone reception signals received on said telephonic communications channel into said audio information messages and wherein said audio information messages are transmitted to said interface on said local communications channel.

50. A method of signalling the actuation of a door bell switch positioned near said door, to at least one telephone of a plurality of telephones connected to a central office line supporting telephonic communications on a telephonic communications channel and supporting local communications on a local communications channel, the method comprising, in response to actuation of the door bell switch, transmitting a control message on said local communications channel.

51. A method as claimed in claim 50 further including the step of receiving said control message at at least one of said telephones.

52. A method as claimed in claim 51 further including the step of dialling on said central office line a pre-determined telephone number of a remotely located telephone, in response to said control message.

53. A method as claimed in claim 52 further including the step of monitoring call progress signals on said central office line to determine whether or not a telephone call is established as a result of dialling said pre-determined telephone number.

54. A method as claimed in claim 53 further including the step of when a telephone call is established, passing audio information messages between said at least one of said telephones and a telephone transmitter and receiver positioned near said door.

55. A method as claimed in claim 54 further including the step of converting said audio information messages received at said telephone, to telephone transmission signals for transmission on said telephonic communications channel.

56. A method as claimed in claim 55 further including the step of converting telephone reception signals received on said telephonic communications channel into said audio information messages.

57. A method as claimed in claim 56 further including the step of passing said control message and said audio information messages, between said telephone transmitter and receiver and said at least one telephone, on said central office line and on said local communications channel.

58. A method as claimed in claim 57 further including the step of time division multiplexing said audio and control messages on said local communications channel.

59. An apparatus for remotely answering a door, the apparatus comprising:
   a) a switch positioned near said door;
   b) a telephone transmitter and receiver near the door;
   c) an interface in communication with said switch for transmitting a signal on a central office line, in response to actuation of said switch; and
   d) a plurality of telephone stations connected to said central office line, at least one of said telephone stations responsive to said signal to place a telephone call on said central office line to a remote telephone and to establish communications on said central office line between said telephone transmitter and receiver and said remote telephone.

60. An apparatus as claimed in claim 59 wherein said transmitter is connected to said central office line such that said control message is transmitted to all of said telephone stations on said central office line.

61. A method of remotely answering a door, the method comprising:
   a) transmitting a signal on a central office line to which at least one telephone is connected in response to actuation of a switch positioned near the door;
   b) receiving said signal at said at least one telephone;
   c) placing a telephone call from said at least one telephone, on said central office line to a remote telephone in response to said signal, by establishing said telephone call between said at least one telephone and a central office; and
   d) establishing communications through said at least one telephone, between said remote telephone and a telephone transmitter and receiver positioned near said door.

62. A method as claimed in claim 61 wherein transmitting a signal includes generating a control message at an interface connected to said telephone transmitter and receiver and transmitting said control message from said interface to said at least one telephone station.

\* \* \* \* \*